United States Patent [19]
Alvesalo

[11] Patent Number: 5,337,344
[45] Date of Patent: Aug. 9, 1994

[54] TELECOMMUNICATION SYSTEM AND A METHOD FOR MATCHING THE NUMBERING SCHEMES OF TWO TELECOMMUNICATION SYSTEMS

[75] Inventor: Antero Alvesalo, Helsinki, Finland

[73] Assignee: Nokia Telecommunications Oy, Espoo, Finland

[21] Appl. No.: 70,310

[22] PCT Filed: Sep. 24, 1992

[86] PCT No.: PCT/FI92/00255

§ 371 Date: Jul. 13, 1993

§ 102(e) Date: Jul. 13, 1993

[87] PCT Pub. No.: WO93/07721

PCT Pub. Date: Apr. 15, 1993

[30] Foreign Application Priority Data

Oct. 3, 1991 [FI] Finland .................... 914655

[51] Int. Cl.⁵ .......................................... H04M 11/00
[52] U.S. Cl. ........................................ 379/58; 379/61; 379/59
[58] Field of Search ................ 379/57, 58, 59, 60, 379/61, 63; 455/33.1, 56.1, 33.2, 38.1

[56] References Cited

U.S. PATENT DOCUMENTS 4,748,661  5/1988  Edelstein et al. ............... 379/289
4,974,251 11/1990  Ohta et al. ..................... 379/61
4,989,230  1/1991  Gillig et al. .................... 379/59
5,265,262 11/1993  Grube et al. .................. 455/56.1

Primary Examiner—Curtis Kuntz
Assistant Examiner—I. Rana
Attorney, Agent, or Firm—Cushman, Darby & Cushman

[57] ABSTRACT

The invention relates to a telecommunication system and a method for matching the numbering schemes of telecommunication systems. The telecommunication system comprises a transmission network comprising at least one mobile exchange (MSC1, MSC2) associated with a subsystem (BUC, BU1-BU6), the calls of subscribers (MT1-MT6) in the subsystem being routed through the transmission network and the mobile exchange. A numbering scheme of the subsystem comprises an X-bit binary subscriber identity code (PID) and a numbering scheme of the transmission network comprises a Y-decimal subscriber identity code (MSIN). In the transmission network the subscriber (MT1-MT6) of the subsystem is assigned a Y-decimal identity code comprising a decimal number derived from the X-bit binary identity code of the subscriber and having no more than Y-1 decimals. At least one system identification decimal is introduced into the obtained decimal number at a predetermined position to indicate that the identity code belongs to the subscriber (MT1-MT6) of the subsystem.

9 Claims, 2 Drawing Sheets

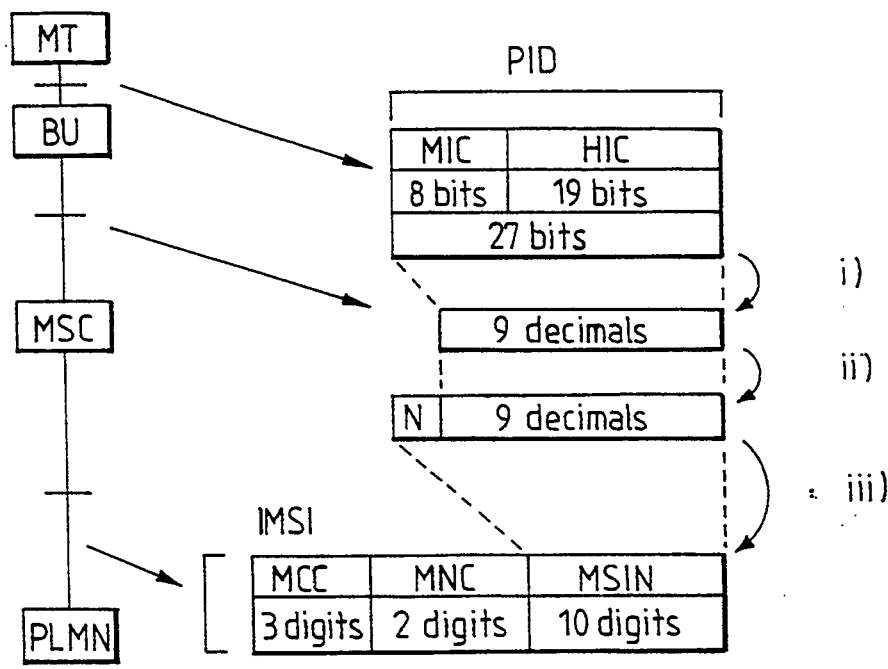
FIG. 2
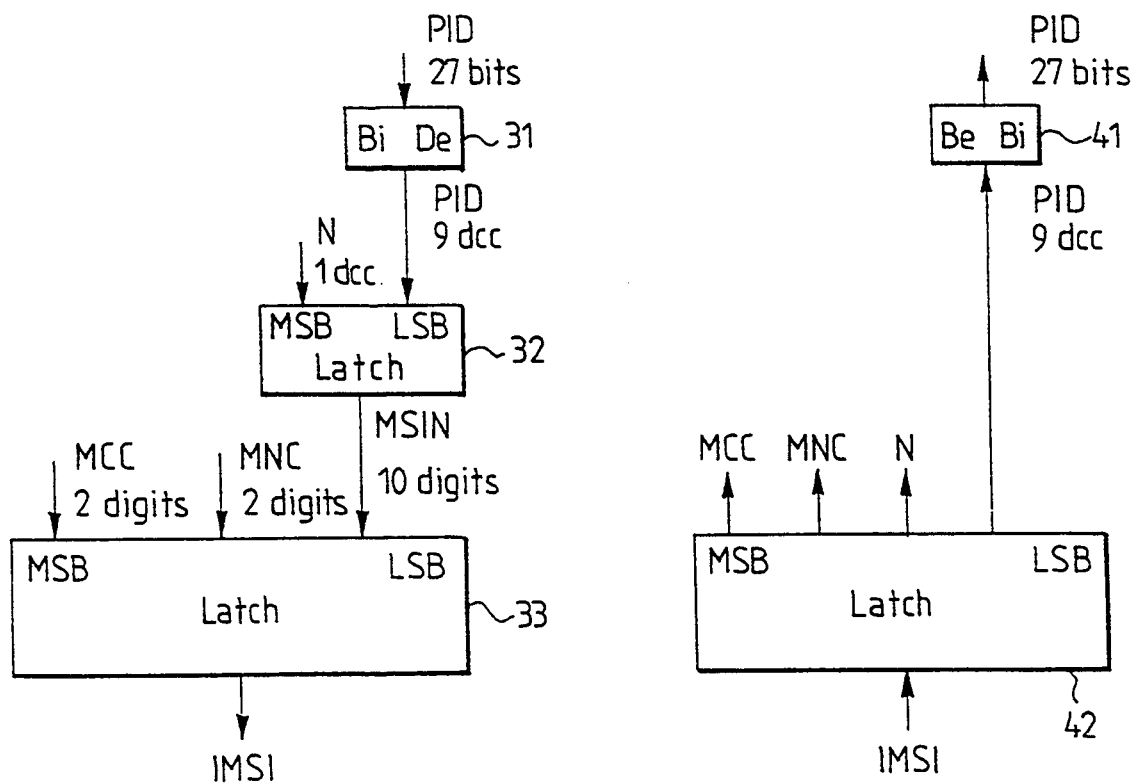
FIG. 3
FIG. 4

TELECOMMUNICATION SYSTEM AND A METHOD FOR MATCHING THE NUMBERING SCHEMES OF TWO TELECOMMUNICATION SYSTEMS

FIELD OF THE INVENTION

The invention relates to a method for matching the numbering scheme of a telecommunication system with the numbering scheme of another telecommunication system at an interface between the systems.

BACKGROUND OF THE INVENTION

Cordless telephone (CT) systems such as the digital cordless telephone system CT2 have recently come out on the market. The CT system comprises a base station connected to a subscriber line in a public switched telephone network (PSTN). There are three different types of base stations: a residential (home) base station, a base station connected to a private branch exchange (PBX) in an office or operating independently as a PBX, and so-called telepoint base stations, by means of which outward calls only are possible for a CT telephone.

As the present-day CT systems are regarded as PSTN subscriber connections (access points), a call is addressed to the CT terminal equipment in a normal way by dialing a telephone number in accordance with the PSTN numbering scheme. On the basis of the telephone number the PSTN thereby routes the call to a respective subscriber connection to which the CT residential base station or the PBX of the CT office base station is connected. The base station pages the CT terminal equipment over the radio path by means of a identity code determined by the numbering scheme of the CT system, and sets up a call when the terminal equipment responds. In practice, it is thus possible to make a call to the CT terminal equipment only through its residential or office base stations (through predetermined subscriber connections).

When the CT terminal equipment desires to set up a call, it establishes a connection to the base station, which checks the authenticity and user rights of the terminal equipment by means of an equipment specific identity code assigned in accordance with the CT numbering scheme, before it connects the terminal equipment "on line" to the PSTN subscriber connection. Thereafter the terminal equipment can dial the telephone number to which the call is addressed in a conventional manner in accordance with the PSTN numbering scheme.

Accordingly, the numbering schemes of the present CT systems serve only the CT radio link and are not utilized anywhere in the PSTN.

In the future it may become advantageous to be able to connect CT systems even to mobile radio networks. As there are no addressable access points (such as PSTN subscriber connections) but only traffic channels used commonly by all mobile subscriber equipments in the mobile radio network, the setup of a call is always based on the use of an identity code assigned to the subscriber equipment.

A problem therewith is, however, that the numbering schemes specified for the cordless telephone system and for the mobile radio system are usually quite different and incompatible. Integrating such systems would require matching of the numbering schemes.

SUMMARY OF THE INVENTION

An object of the invention is to match such different numbering schemes as efficiently and as simply as possible.

A further object of the invention is to utilize the inherent identity information of the terminal equipment of the cordless telephone system in such a way that compatibility with the procedure used in the identification of the mobile terminal equipment in the mobile radio network is obtained.

This is achieved by means of a method according to the invention, wherein in the second telecommunication system the subscriber/equipment of the first telecommunication system is assigned a Y-decimal identity code obtained by converting the X-bit binary identity code of the subscriber/equipment into a decimal number comprising no more than Y−1 decimals, and by introducing one or more system identification decimals to the obtained decimal number at a predetermined position, the system identification decimal(s) indicating that the subscriber/equipment identity code belongs to the subscriber/equipment of the first telecommunication system.

The invention also relates to a telecommunication system comprising a transmission network utilizing a first numbering scheme and comprising at lest one mobile exchange connected to a subsystem utilizing a different numbering scheme, the calls of subscribers in the subsystem being routed through the transmission network and said mobile exchange. According to the invention, the system is characterized in that the numbering scheme of the subsystem comprises an X-bit binary subscriber/equipment identity code, and the numbering scheme of the transmission network comprises a Y-decimal subscriber/equipment identity code; and that in the transmission network the subsystem subscriber/equipment is assigned a Y-decimal identity code comprising a decimal number derived from the X-bit binary identity code of the subscriber/equipment and including no more than Y-1 numbers, at least one system identification decimal code being added to the obtained decimal number at a predetermined position, the system identification code(s) indicating that the identity code belongs to the subscriber/equipment of the subsystem.

By means of the invention, a unique subscriber identity code for the fixed transmission network can be derived from the binary subscriber identity code of the subsystem by a simple algorithm. Correspondingly, the unique subsystem subscriber identity code can be restored from the subscriber identity code of the fixed transmission network by an inverse algorithm. The algorithms are valid for all subsystem subscriber identities, and the fixed transmission network identities derived from them, and so it is possible to avoid e.g. the need to use large conversion tables difficult to update. Conversions can be performed identically at all intersystem interfaces; the only requirement is that the conversion algorithms are similar everywhere.

The subscriber identity codes of the subsystem can be assigned in a normal way completely independently of the numbering of the fixed transmission network. The numbering schemes of both systems can be maintained unchanged so that they comply with the respective specifications. As the decimal numbers derived from the subscriber identity codes of the subsystem are provided with a special subsystem identification number, it is ensured that the obtained fixed transmission network identity is unique and that the fixed transmission network is able to identify certain subscriber identities as subsystem subscriber identities, e.g. for special network functions.

BRIEF DESCRIPTION OF THE DRAWINGS

In the following the invention will be described by means of illustrating embodiments with reference to the attached drawings, in which

FIG. 2 is a block and flow diagram illustrating the method according to the invention for matching the numbering schemes in the system shown in FIG. 1; and FIGS. 3 and 4 are block diagrams illustrating IMSI/PID and PID/IMSI converters which can be used in the system shown in FIG. 1.

DETAILED DESCRIPTION OF THE INVENTION

Figure 1:
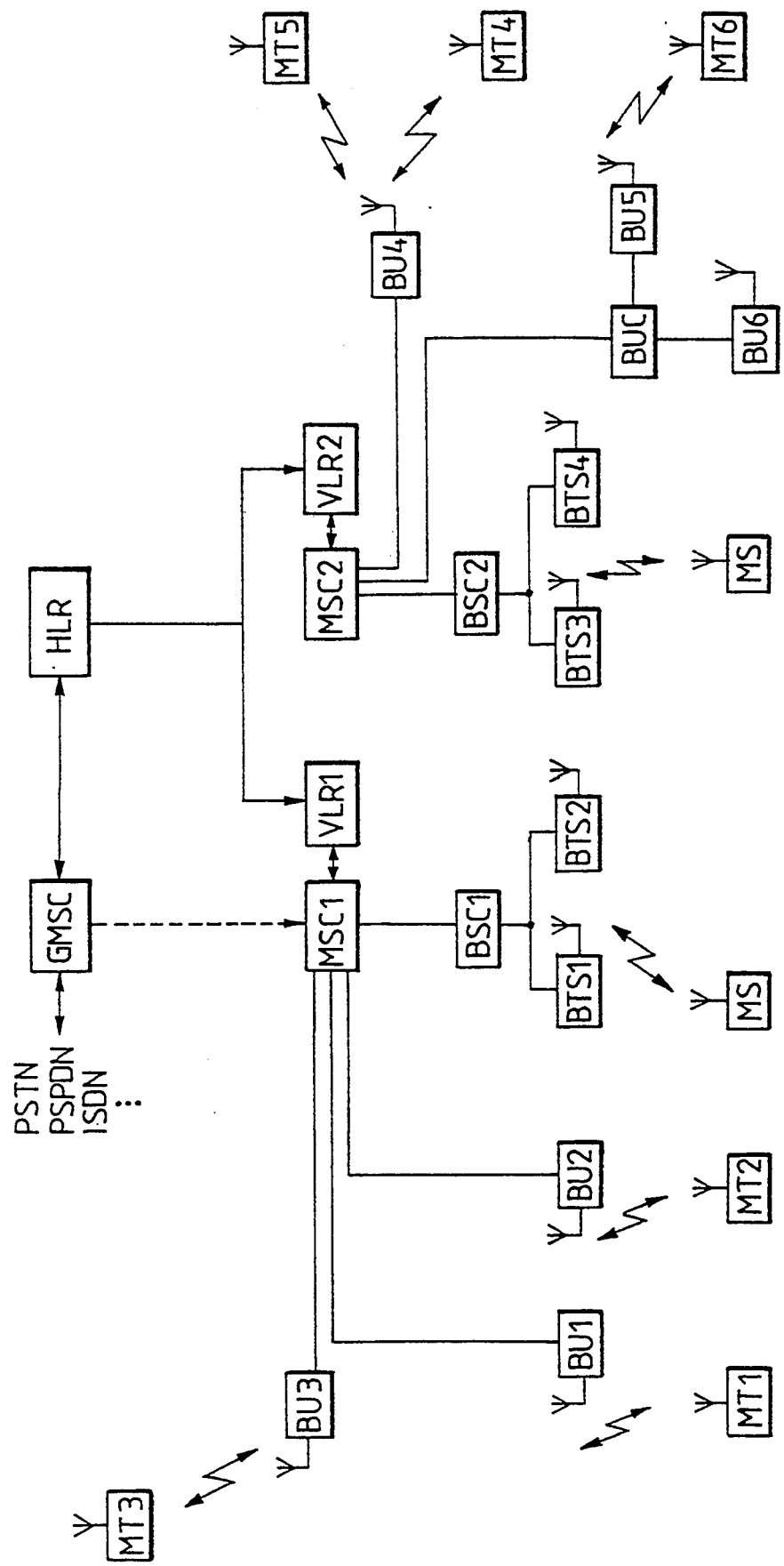
FIG. 1 illustrates schematically a cellular mobile radio network in which the method according to the invention may be applied.

In the text below the invention will be described by means of an example in which a digital cordless telephone system CT2 is connected to form part of the digital cellular mobile radio system GSM, which is the primary application of the invention. The method according to the invention can, however, also be applied when connecting other cordless telephone systems, such as the DECT (Digital European Cordless Telephone) to the GSM or its modifications or to other similar mobile radio systems or switched transmission networks (e.g. ISDN).

The basic structure and basic functions of the GSM mobile radio system are well-known to one skilled in the art and relatively accurately defined in the specifications of the GSM system. In the following a few basic concepts and elements of the GSM system will be defined with reference to FIG. 1. An area within which the GSM mobile radio services are available is called a GSM network (GSM service area), which may cover several countries. The GSM network may be divided into national GSM networks (PLMN service area), i.e. areas covered by one operator offering GSM services. There may also be several GSM networks in the same country and the areas covered by them may overlap geographically. In the text below, the GSM network primarily refers to such a "national" network.

The GSM network may comprise one or more MSC areas, i.e. areas within which services are provided by a single mobile services switching centre MSC (mobile exchange). The MSC area, in turn, may be divided into one or more location areas each covered by one or more radio cells. The cell is the smallest geographical area of the system, comprising one or more fixed radio stations, i.e. base stations, and using predetermined radio channels.

The GSM network comprises at least one home location register (HLR), which is a data base in which subscriber data, such as location data, are stored permanently. The system also comprises several visitor location registers (VLR) each associated with one or more central areas. However, each MSC area has a single VLR. The VLR is a data base in which subscriber data are stored while the mobile station MS visits the area of the VLR. The VLR stores information of the location of the mobile station MS with the accuracy of one location area. The HLR, in turn, stores information of the VLR that the mobile radio visits and it provides routing data for routing mobile stations MS terminating calls in the network. The HLR, in turn, receives the required routing data from the VLR. The HLR and the VLR have only a signalling connection to the other components of the mobile radio network.

Within the GSM network the subscriber identification is based on the International Mobile Subscriber Identity IMSI, which comprises a GSM Mobile Country Code MCC (three digits), a Mobile Network Code MNC (2 digits) of the national GSM network, and a Mobile Station Identification Number MSIN (ten digits). The MSIN is unique within a certain national GSM network and can be specified by the network operator.

FIG. 1 illustrates two MSC areas, one with a MSC1 and a VLR1 and the other with a MSC2 and a VLR2 for the traffic control. There are one or more location areas under the MSC area covered by both the MSC1 and MSC2, and each location area comprises a base station controller BSC1 and BSC2, respectively, which controls several fixed radio stations, i.e. base transceiver stations BTS. Each radio cell comprises one BTS, and one base station controller BTC provides services for several cells. A mobile station MS located in the cell establishes a two-way radio link to the BTS of the cell. Both a signalling connection and speech channels are provided between the BSC and the MSC.

The GSM network is usually connected to other networks, such as the public telephone network (PSTN), another mobile network (PSPDN) or an ISDN network through a certain MSC called a gateway MSC.

According to the invention the cordless telephone system CT2 is integrated as a subsystem for the GSM system by connecting the CT2 base stations BU under the control of the MSC. In FIG. 1, the CT2 base stations BU1, BU2 and BU3 are connected to the MSC1, and the CT2 base stations BU4 and BU5 are connected to the MSC2. The CT2 base station controller BUC is also connected to the MSC2. In practice, the BUC may be e.g. a telephone exchange PABX operating in compliance with the CT2 specification and controlling base stations BU5–BU6. The mobile services switching centres MSC and the CT2 base stations BU and base station controllers BUC are provided with suitable additional equipment and software for combining the mobility functions of the systems and for matching the number schemes of the systems.

In principle, the GSM transmission network may handle CT2 subscribers similarly as actual GSM subscribers although the CT2 and GSM systems are fully separate radio systems at least on the radio path level.

The CT2 system and the GSM system, however, have completely different numbering schemes, and so the CT2 subscriber identity codes cannot be used as such in the GSM network.

In the CT2 system the CT2 terminal equipment identity code is a binary 27-bit PID (Portable Identity Code) which, in turn, comprises two portions: an 8-bit MIC (Manufacturer Identity Code) and a 19-bit HIC (Handset Identity Code). This code is used in compliance with the CT2 Common Air Interface (CAI) specification over the radio path between the CT2 base station BU and the CT2 terminal equipment MT. The CAI specification is described e.g. in *CT2 Common Air Interface*, M. W. Evans, British Telecommunications Engineering, Vol. 9, July 1990, p. 103–111.

According to the invention, each CT2 terminal equipment is assigned another subscriber identity code for the GSM system, which identity code corresponds to the GSM IMSI. This identity code has to be unique in the GSM network, and it has to be convertible into a CT identity code and again restored at all interfaces between these systems.

In the following the conversion of the PID into the IMSI (PID/IMSI conversion) according to the invention will be described with reference to FIG. 2:

i) A 27-bit binary PID is converted into decimal number (maximum value 134217727), which requires no more than 9 decimals. In the decimal number (usually a BCD number) so obtained, the non-significant zeros are maintained in front of the significant numbers, and so the decimal numbers are always presented with 9 decimals, and the IMSI associated with the CT2 terminal equipment is unambiguous within the entire area of the GSM network (i.e. globally unambiguous).

ii) A CT2 System identity number N, by means of which the GSM system is able to distinguish a CT2 subscriber from GSM subscribers, is added at a desired position to the 9-decimal number produced as described under item i), e.g. as the most significant number. This results in a 10-number decimal number which forms an MSIN complying with the GSM specifications.

iii) First the network code MNC and then the country code MCC are added to the MSIN produced as described under item ii) as the most significant numbers, thus obtaining an IMSI complying with the GSM specifications, which can be used as such as a CT2 terminal equipment identity code in the GSM network.

The IMSI is converted into the PID (IMSI/PID conversion) by performing the inverse conversions of the conversions i–iii in reverse order.

The final IMSI is always formed at the latest in the MSC, so that the IMSI is used for the CT2 terminal equipment everywhere in the GSM network outside the MSCs. On the other hand, the PID is always used over the radio path between the BU and the MT. The functions required for the PID/IMSI and IMSI/PID conversions can, in principle, be shared in any way between the BU or BUC and the MSC.

In the preferred embodiment of the invention shown in FIG. 2, where there is provided an ISDN interface between the BU and the MSC, the conversion i) is performed at the CT2 base station BU so that a decimal number can be transferred through the ISDN interface. The mobile services switching centre MSC performs items ii) and iii) by adding the CT2 system identity number N and the GSM network and country codes MCC and MNC to the decimal number.

Alternatively, the BU may perform the conversion steps i) and ii) or all the conversion steps i) through iii).

Another alternative is to utilize the binary PID in the data transmission between the BU and the MSC and perform all conversion steps i) through iii) in the MSC.

In the preferred embodiment of the invention, the conversions are performed by software, although they may also be performed by the circuit arrangements shown in FIGS. 3 and 4, for instance.

In FIG. 3, a binary/decimal converter 31 performs the conversion i) and the conversion result is applied to the input of a latch circuit 32 as the 9 least significant decimals. The number N, which is a preselected constant, is applied to the input of the latch circuit 32 as the following more significant decimal, so that a 10-decimal MSIN is obtained in the output of the latch circuit 32 (conversion ii). Correspondingly, the MCC and the MNC are fed in the input of a latch circuit 33 in front of the MSIN as the more significant decimals, so that the output will give the IMSI (conversion iii). In FIG. 4, the IMSI is fed to the input of a latch circuit 42, whereas only the 9 least significant decimals are fed from the output of the latch circuit 42 (inverse conversions iii and ii) to a decimal/binary converter 41, so that the output of the converter 41 will give the binary PID (inverse conversion i).

Generally speaking, the invention is suitable for the conversion of any X-bit binary subscriber identity code into a decimal number comprising no more than Y−1 decimals, to which at least one subsystem identity number N is added so that a Y-decimal subscriber identity code of the other system is obtained, the possible network and country codes being added to the subscriber identity code. X and Y are thereby determined on the basis of the numbering schemes to be matched in each particular case. In the example above, Y=10 and X=27.

The subscriber identity code may herein refer to either a subscriber specific identity code or to a terminal specific identity code, depending on the systems to be integrated in each particular case.

The drawings and the description related to them are only intended to illustrate the present invention. In their details, the method and the telecommunication system according to the invention may vary within the scope of the attached claims.

I claim:

1. A method for matching the numbering scheme of a telecommunication system with the numbering scheme of another telecommunication system at an interface between the systems, the numbering scheme of the first telecommunication system comprising an X-bit binary subscriber/equipment specific identity code, and the numbering scheme of the second telecommunication system comprising a Y-decimal subscriber/equipment specific identity code, characterized in that in the second telecommunication system the subscriber/equipment of the first telecommunication system is assigned a Y-decimal identity code obtained by converting the X-bit binary identity code of the subscriber/equipment into a decimal number comprising no more than Y−1 decimals, and by introducing one or more system identification decimals into the obtained decimal number at a predetermined position, the system identification decimal(s) indicating that the subscriber/equipment identity code belongs to the subscriber/equipment of the first telecommunication system.

2. A method according to claim 1, characterized in that a network code and/or country code is utilized in the subscriber/equipment identity code used in the second system.

3. A method according to claim 1 or 2, characterized in that Y=10, X=27, and that the 27-bit binary identity code is converted into a 9-number decimal number and one system identification decimal is introduced as the most significant decimal to obtain a 10-decimal number.

4. A telecommunication system comprising a transmission network utilizing a first numbering scheme and comprising at least one mobile exchange (MSC1, MSC2) connected to a subsystem (BUC, BU1–BU6) utilizing a different numbering scheme, the calls of subscribers (MT1–MT6) in the subsystem being routed through the transmission network and said mobile exchange, characterized in that the numbering scheme of the subsystem comprises an X-bit binary subscriber/equipment identity code (PID), and the numbering scheme of the transmission network comprises a Y-decimal subscriber/equipment identity code (MSIN); and that in the transmission network the subsystem subscriber/equipment is assigned a Y-decimal identity code comprising a decimal number derived from the X-bit binary identity code of the subscriber/equipment and including no more than Y−1 numbers, at least one system identification decimal code being added to the obtained decimal number at a predetermined position, the system identification code(s) indicating that the identity code belongs to the subscriber/equipment (MT1–MT6) of the subsystem.

5. A system according to claim 4, characterized in that a network code and/or country code (MNC, MCC) is utilized as the most significant decimals in the subscriber/equipment identity code (IMSI) in the numbering scheme of the transmission system.

6. A system according to claim 4, characterized in that the subsystem is a cordless telephone system comprising at least one fixed radio station (BU1–BUS) and at least one subscriber radio station (MT1–MT6), and that said binary subscriber/equipment identity code (PID) is used in the communication between the fixed radio station (BU1–BUS) and the subscriber radio station (MT1–MT6).

7. A system according to claim 6, characterized in that the decimal number version of the binary subscriber/equipment identity code (PID) is used in the communication between the subsystem and the associated mobile exchange (MSC1, MSC2), and that the subsystem comprises binary/decimal and decimal/binary conversion means (31, 41) for converting the subscriber/equipment identity code, and that the mobile exchange (MSC1, MSC2) comprises means (32, 33, 42) for converting said decimal number version into a subscriber/equipment identity code (IMSI, MSIN) complying with the numbering scheme of the transmission system, and vice versa.

8. A system according to claim 6, characterized in that said binary subscriber/equipment identity code is used in the communication between the subsystem and the associated mobile exchange (MSC1, MSC2), and that the mobile exchange (MSC1, MSC2) comprises means (31–33, 41, 42) for converting said binary subscriber/equipment identity code (PID) into the subscriber/equipment identity code (IMSI, MSIN) complying with the numbering scheme of the transmission system, and vice versa.

9. A system according to claim 6, characterized in that the subscriber/equipment identity code of the numbering scheme of the transmission system is used in the communication between the subsystem and the associated mobile exchange (MSC1, MSC2), and that the subsystem comprises means (31–33, 41, 42) for converting said binary subscriber/equipment identity code (PID) into the subscriber/equipment identity code (IMSI, MSIN) complying with the numbering scheme of the transmission system, and vice versa.

* * * * *